United States Patent
Li et al.

(10) Patent No.: US 11,573,370 B2
(45) Date of Patent: Feb. 7, 2023

(54) SYSTEMS AND METHODS FOR QUANTUM COMMUNICATION USING OPTICAL FIBER LINKS HAVING A SCATTERING REGION

(71) Applicant: CORNING INCORPORATED, Corning, NY (US)

(72) Inventors: Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/970,704

(22) PCT Filed: Feb. 19, 2019

(86) PCT No.: PCT/US2019/018477
§ 371 (c)(1),
(2) Date: Aug. 18, 2020

(87) PCT Pub. No.: WO2019/161354
PCT Pub. Date: Aug. 22, 2019

(65) Prior Publication Data
US 2020/0379171 A1    Dec. 3, 2020

Related U.S. Application Data

(60) Provisional application No. 62/632,137, filed on Feb. 19, 2018.

(51) Int. Cl.
G02B 6/036 (2006.01)
G02B 6/42 (2006.01)
(Continued)

(52) U.S. Cl.
CPC ......... *G02B 6/03694* (2013.01); *G02B 6/421* (2013.01); *G02B 6/43* (2013.01);
(Continued)

(58) Field of Classification Search
CPC ...... G02B 6/03694; G02B 6/421; G02B 6/43; G02B 6/4287; G02B 6/4246;
(Continued)

(56) References Cited

U.S. PATENT DOCUMENTS 7,450,806 B2    11/2008    Bookbinder et al.
8,545,076 B2    10/2013    Bickham et al.
(Continued)

FOREIGN PATENT DOCUMENTS

EP    0905834 A2    3/1999
WO    2016/204847 A2    12/2016

OTHER PUBLICATIONS

Hayashi, Masahito, "Analysis of Quantum Communication Protocols" in Quantum Information Theory Mathematical Foundation, Chapter 9, 2nd edition, 2005, 118 pages.
(Continued)

*Primary Examiner* — Kaveh C Kianni
*Assistant Examiner* — Hung Q Lam
(74) *Attorney, Agent, or Firm* — Svetlana Short

(57) ABSTRACT

A quantum communication system that includes a multiphoton entanglement generator, a plurality of photon detector units, and a plurality of optical fiber links. The plurality of photon detector units include a first photon detector unit and a second photon detector unit. The multiphoton entanglement generator is structurally configured to output more than two entangled photons. The plurality of optical fiber links comprise a first optical fiber link optically coupled to the multiphoton entanglement generator and disposed between the multiphoton entanglement generator and the first photon detector unit. The plurality of optical fiber links comprise a second optical fiber link optically coupled to the multiphoton entanglement generator and disposed between the multiphoton entanglement generator and the second photon
(Continued)

detector unit. Further, at least one of the plurality of optical fiber links has a core, a cladding, and a scattering region having a plurality of scattering structures.

29 Claims, 5 Drawing Sheets

(51) Int. Cl.

| | | |
|---|---|---|
| *G02B 6/43* | (2006.01) | |
| *G02F 1/35* | (2006.01) | |
| *G02F 1/39* | (2006.01) | |
| *H04B 10/25* | (2013.01) | |
| *H04B 10/70* | (2013.01) | |

(52) U.S. Cl.
CPC .............. *G02F 1/3526* (2013.01); *G02F 1/39* (2013.01); *H04B 10/25* (2013.01); *H04B 10/70* (2013.01)

(58) Field of Classification Search
CPC ......... G02F 1/3526; G02F 1/39; H04B 10/25; H04B 10/70; H04B 10/2507
USPC .................... 385/123–125, 127, 142, 143
See application file for complete search history.

(56) References Cited

U.S. PATENT DOCUMENTS

| | | | |
|---|---|---|---|
| 8,591,087 B2 | 11/2013 | Bickham et al. | |
| 8,620,125 B2 | 12/2013 | Button et al. | |
| 8,805,141 B2 | 8/2014 | Fewkes et al. | |
| 2009/0129721 A1* | 5/2009 | Chen ..................... | G01F 23/292 |
| | | | 385/12 |
| 2009/0257242 A1* | 10/2009 | Wendman ............ | G02B 6/0003 |
| | | | 362/553 |
| 2014/0314419 A1 | 10/2014 | Paik | |
| 2015/0268162 A1* | 9/2015 | Lear .................... | H01L 31/1085 |
| | | | 356/128 |
| 2016/0233964 A1 | 8/2016 | Frohlich et al. | |
| 2017/0163415 A1* | 6/2017 | Gray ...................... | H04J 14/04 |

OTHER PUBLICATIONS

International Search Report and Written Opinion of the International Searching Authority; PCT/US2019/018477; dated Jun. 3, 2019; 16 Pages; Korean Intellectual Property Office.
Kerker, Milton,"Analysis of Particle Size" in The Scattering of Light and Other Electromagnetic Radiation, Chapter 7, Academic press, 1969, 108 pages.
Miguel Orszag, , Quantum Optics, Springer, 2007.

* cited by examiner

SYSTEMS AND METHODS FOR QUANTUM COMMUNICATION USING OPTICAL FIBER LINKS HAVING A SCATTERING REGION

CROSS-REFERENCE TO RELATED APPLICATIONS

This application claims the benefit of priority under 35 U.S.C. § 371 of International Application No. PCT/US2019/018477, filed on Feb. 19, 2019, which claims the benefit of priority of U.S. Application Ser. No. 62/632,137 filed on Feb. 19, 2018 the contents of which are relied upon and incorporated herein by reference in their entirety as if fully set forth below.

BACKGROUND

The present disclosure relates to quantum communication systems and methods of communicating using these systems. More specifically, the present disclosure relates to quantum communication systems that include optical fiber links that have a scattering region.

BRIEF SUMMARY

According to the subject matter of the present disclosure, a quantum communication system includes a multiphoton entanglement generator, a plurality of photon detector units, and a plurality of optical fiber links. The plurality of photon detector units include a first photon detector unit and a second photon detector unit. The multiphoton entanglement generator is structurally configured to output more than two entangled photons. The plurality of optical fiber links comprise a first optical fiber link optically coupled to the multiphoton entanglement generator and disposed between the multiphoton entanglement generator and the first photon detector unit. The plurality of optical fiber links comprise a second optical fiber link optically coupled to the multiphoton entanglement generator and disposed between the multiphoton entanglement generator and the second photon detector unit. Further, at least one of the plurality of optical fiber links has a core, a cladding, and a scattering region having a plurality of scattering structures.

In accordance with one embodiment of the present disclosure, a quantum communication system that includes a first photon detector unit, a second detector unit, and two photon entanglement chains each extending between the first photon detector unit and the second photon detector unit. Each photon entanglement chain includes a first end and a second end, a first terminating quantum memory positioned at the first end and a second terminating quantum memory positioned at the second end, an originating multiphoton entanglement generator, a first intermediate multiphoton entanglement generator and a second intermediate multiphoton entanglement generator, a first intermediate quantum repeater disposed between the first intermediate multiphoton entanglement generator and the originating multiphoton entanglement generator, and a second intermediate quantum repeater disposed between the second intermediate multiphoton entanglement generator and the originating multiphoton entanglement generator. Further, each photon entanglement chain includes a first optical fiber link disposed between and optically coupled to the first intermediate quantum repeater and the first intermediate multiphoton entanglement generator, a second optical fiber link disposed between and optically coupled to the first intermediate quantum repeater and the originating multiphoton entanglement generator, a third optical fiber link disposed between and optically coupled the second intermediate quantum repeater and the second intermediate multiphoton entanglement generator, a fourth optical fiber link disposed between and optically coupled to the second intermediate quantum repeater and the originating multiphoton entanglement generator, a fifth optical fiber link is optically coupled to the first intermediate multiphoton entanglement generator and is disposed between the first intermediate multiphoton entanglement generator and the first end of the photon entanglement chain, and a sixth optical fiber link is optically coupled to the second intermediate multiphoton entanglement generator and is disposed between the second intermediate multiphoton entanglement generator and the second end of the photon entanglement chain. Moreover, at least one of the first optical fiber link, the second optical fiber link, the third optical fiber link, the fourth optical fiber link, the fifth optical fiber link, and the sixth optical fiber link have a core, a cladding, and a scattering region having a plurality of scattering structures and spaced radially apart from the core-cladding interface.

In accordance with yet another embodiment of the present disclosure, a quantum communication system includes a first photon detector unit, a second detector unit, and two photon entanglement chains each extending between the first photon detector unit and the second photon detector unit. Each photon entanglement chain includes a first end and a second end, a first terminating quantum memory positioned at the first end and a second terminating quantum memory positioned at the second end, an originating quantum repeater, a first intermediate multiphoton entanglement generator disposed between the originating quantum repeater and the first terminating quantum memory, and a second intermediate multiphoton entanglement generator disposed between the originating quantum repeater and the second terminating quantum memory. Further, the quantum communications system includes a first optical fiber link disposed between and optically coupled to the originating quantum repeater and the first intermediate multiphoton entanglement generator, a second optical fiber link disposed between and optically coupled to the originating quantum repeater and the second intermediate multiphoton entanglement generator, a third optical fiber link optically coupled to the first intermediate multiphoton entanglement generator and disposed between the first intermediate multiphoton entanglement generator and the first end of the photon entanglement chain, and a fourth optical fiber link optically coupled to the second intermediate multiphoton entanglement generator and disposed between the second intermediate multiphoton entanglement generator and the second end of the photon entanglement chain. Moreover, at least one of the first optical fiber link, the second optical fiber link, the third optical fiber link, and the fourth optical fiber link includes a core, a cladding, and a scattering region having a plurality of scattering structures and spaced radially apart from the core-cladding interface.

Although the concepts of the present disclosure are described herein with primary reference to quantum key generation, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in detail to embodiments for quantum information communication, for example, quantum key generation or other quantum communications, using an entanglement based quantum communication process. In particular, quantum communication systems are described herein that include a plurality of photon detector units, a multiphoton entanglement generator, and a plurality of optical fiber links. As described in detail herein, the multiphoton entanglement generator is configured to generate photons that are entangled and share a quantum state. While not intending to be limited by theory, when entangled photons that share a quantum state are received at each photon detector unit, the photon detector units may use quantum information determinable from the entangled photons to form a quantum key or other shared message at each photon detector unit. The multiphoton entanglement generator is configured to generate more than two entangled photons, for example, two or more pairs of entangled photons. Thus, when entangled photons are output into the plurality of optical fiber links, if one of entangled photon of the more than two entangled photons is attenuated and another entangled photon of the more than two entangled photons is propagating toward the same destination (such as a photon detector unit), the remaining entangled photon may be received by the destination and the attenuation does not cause measurement error.

However, when an entangled photon propagating in the quantum communication systems described herein attenuates, for example, by scattering out of a core of an optical fiber link as a result of Rayleigh scattering, this attenuated photon may be absorbed, for example, by a coating layer of the optical fiber link. This absorption is effectively a measurement event, thereby heralding the outcome of this measurement onto the other photons entangled with the attenuated photon. Heralding the photons entangled with the attenuated photon effects the polarization state of these photons and may cause errors in the actual measurement of these photons (e.g., measurements at the photon detector units), thereby reducing the quantum bit rates and the overall effectiveness of the system.

The embodiments described herein propose a system and method to overcome these attenuation penalties. In particular, the system of the present disclosure reduces prevents unwanted attenuation and absorption events that cause entangled photons to herald by inducing a post attenuation scattering event before the attenuated photon is absorbed. While not intending to be limited by theory, this post attenuation scattering event disentangles the attenuated photon from the remaining photons in the system. The post attenuation scattering event may be induced by a scattering region disposed in the optical fiber link at a location spaced radially outward from a core-cladding interface of the optical fiber link.

Figure 1:
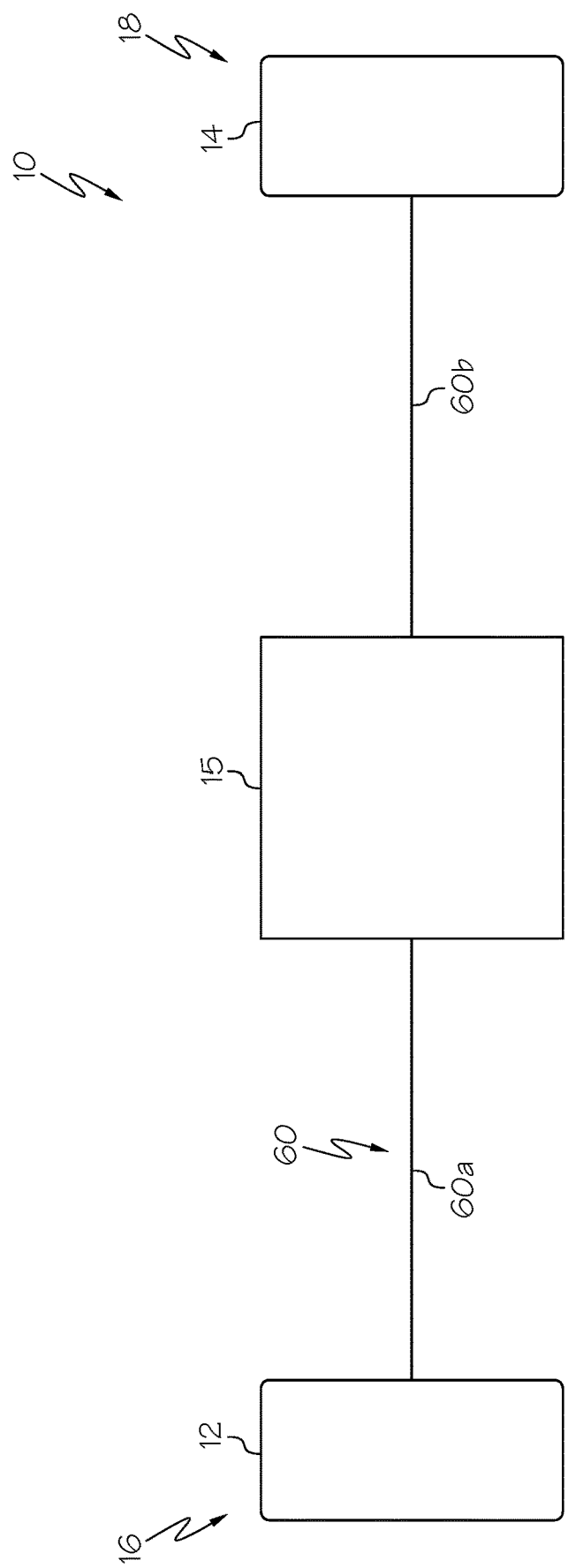
FIG. 1 schematically depicts a quantum communication system comprising a multiphoton entanglement generator, a plurality of photon detectors, and a plurality of optical fiber links, according to the embodiments shown and described herein.

Referring now to FIG. 1, a quantum communication system 10 comprising a multiphoton entanglement generator 15, a first photon detector unit 12, a second photon detector unit 14, and a plurality of optical fiber links 60 is schematically depicted. In the embodiment depicted in FIG. 1, the multiphoton entanglement generator 15 is disposed between the first photon detector unit 12 and the second photon detector unit 14. For example, the first photon detector unit 12 may be disposed at a first end 16 of the quantum communication system 10 and the second photon detector unit 14 may be disposed at a second end 18 of the quantum communication system 10. As depicted in FIG. 1, the first end 16 may be opposite the second end 18. However, it should be understood that any spatial arrangement of the first photon detector unit 12 and the second photon detector unit 14 is contemplated.

Further, the plurality of optical fiber links 60 include a first optical fiber link 60a and a second optical fiber link 60b. The first optical fiber link 60a is optically coupled to the multiphoton entanglement generator 15 and disposed between the multiphoton entanglement generator 15 and the first photon detector unit 12. The second optical fiber link 60b is optically coupled to the multiphoton entanglement generator 15 and disposed between the multiphoton entanglement generator 15 and the second photon detector unit 14. In some embodiments, the first photon detector unit 12 may comprise a multi-photon detector. In other embodiments, first photon detector unit 12 may comprise a single-photon detector, e.g., a superconducting nanowire single-photon detector, a low noise photodiode, or the like. In some embodiments, the second photon detector unit 14 may comprise a multi-photon detector. In other embodiments, second photon detector unit 14 may comprise a single-photon detector, e.g., a superconducting nanowire single-photon detector, a low noise photodiode, or the like.

Referring still to FIG. 1, the multiphoton entanglement generator 15 is structurally configured to output more than two entangled photons, for example, three entangled photons, four entangled photons, or more. For example, the multiphoton entanglement generator 15 may comprise two or more parametric down conversion generators, each configured to output one or more pairs of entanglement photons. The parametric down conversion generators may comprise a laser source and a non-linear crystal. In other embodiments, the multiphoton entanglement generator 15' may be structurally configured to generate an entangled pairs of photons using a four-wave mixing process or any other known or yet to be developed method or process of generating an more than two entangled photons. Further, in some embodiments, the multiphoton entanglement generator 15 is structurally configured to simultaneously output two or more entangled photons.

In operation, the multiphoton entanglement generator 15 may output two or more entangled photons into each optical fiber link 60, for example, a first pair of entangled photons may be output into the first optical fiber link 60a and a second pair of entangled photons may be output into the second optical fiber link 60b. In other embodiments, additional optical fiber links 60 may be optically coupled to the multiphoton entanglement generator 15 such that the multiphoton entanglement generator 15 may output any number of entangled photons into each optical fiber link 60. As an illustrative example, when two or more entangled photons are output into each optical fiber link 60, if one entangled photon of the two or more entangled photons is attenuated as the two or more entangled photons traverse the optical fiber link 60, the one or more remaining entangled photons of the two or more entangled photons may be received by a component optically coupled to the opposite end of the optical fiber link, such as the first photon detector unit 12, the second photon detector unit 14, a quantum repeater (as described below with respect to FIGS. 5-7), or any other known or yet to be developed component of a system configured for quantum communications.

The plurality of optical fiber links 60 provide optical pathways between various components of the quantum communication system 10. The optical fiber links 60 may comprise single core and/or multicore optical fiber links 60. As described in more detail below, at least one of the plurality of optical fiber links 60 of the quantum communication system 10 comprises a scattering region structurally configured to induce a post attenuation scattering event that disentangles an attenuated entangled photon from other entangled photons propagating in the quantum communication system 10.

Figure 2:
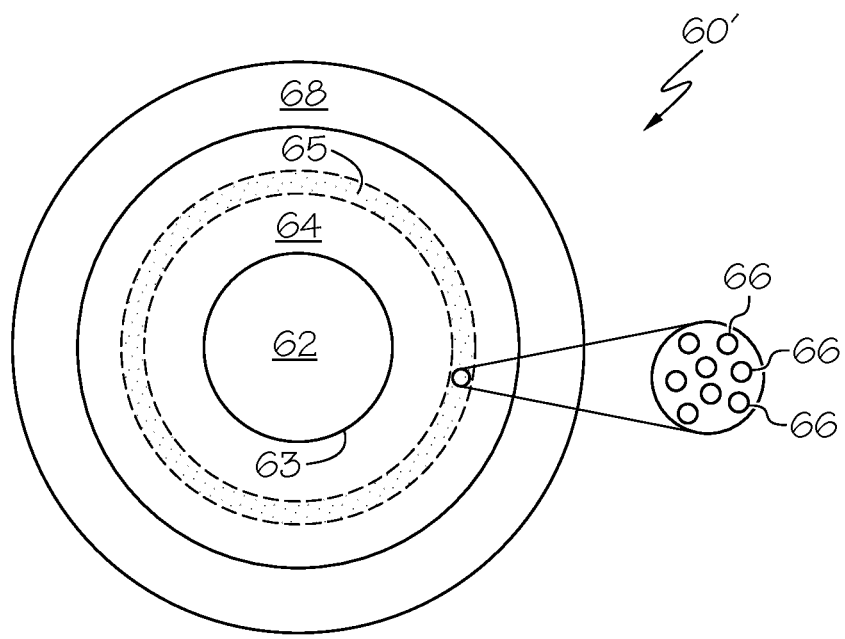
FIG. 2 schematically depicts an example optical fiber link having a scattering region disposed in a cladding of the optical fiber link, according to the embodiments shown and described herein.
Figure 3:
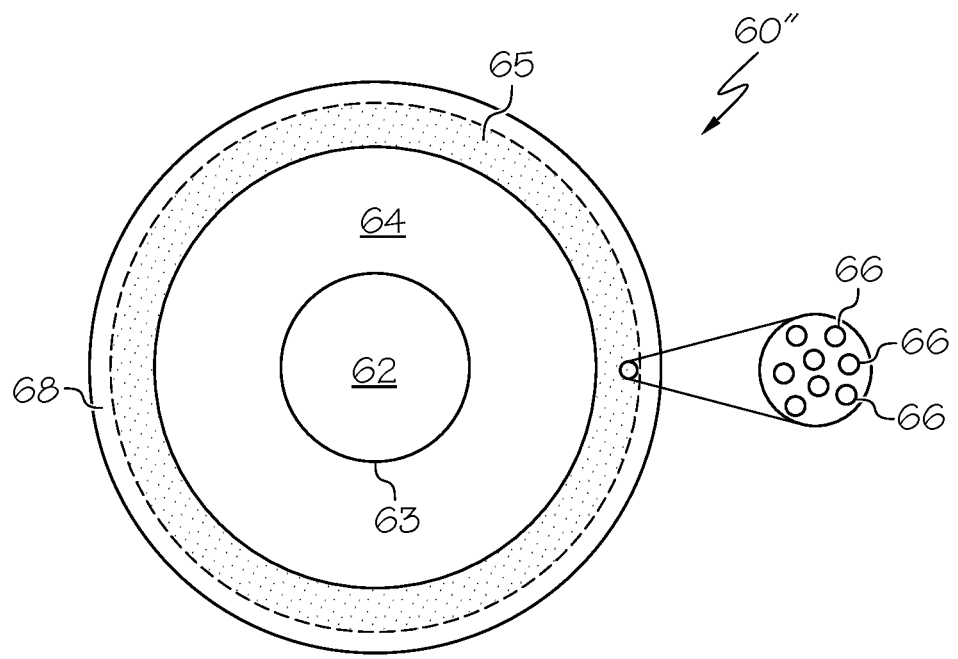
FIG. 3 schematically depicts an example optical fiber link having a scattering region disposed in a coating layer of the optical fiber link, according to the embodiments shown and described herein.

Referring now to FIGS. 2 and 3, cross sections of example optical fiber links 60',60" having a scattering region 65 are depicted. The optical fiber links 60',60" may be disposed in any of known or yet to be developed quantum communication systems, such as, any entanglement based quantum communications system. For example, the first optical fiber link 60a and the second optical fiber link 60b of FIG. 1 may comprise any of the embodiments of the optical fiber links 60',60" described herein. As depicted in FIGS. 2 and 3, the optical fiber links 60',60" each comprise a core 62, a cladding 64 surrounding the core 62, and a scattering region 65. In some embodiments, the optical fiber links 60 may comprise one or more additional layers, for example, coatings, jackets, or the like. For example, the optical fiber links 60',60" may comprise a coating layer 68. The coating layer 68 may comprise a polymer coating and may be disposed around the cladding 64 for ease of mechanical handling.

The core 62 of the optical fiber links 60',60" may be a glass core, for example, silica, germania doped silica, fluorine-doped silica, or a polymer core, such as a low index polymer. The cladding 64 may comprise a glass, a polymer core, or the like, for example, a low index polymer such as UV or thermally curable fluoroacrylate or silicone, or the like. The cladding 64 comprises a depressed refractive index relative to the core 62. For example, the cladding 64 may comprise a relative refractive index (with respect to the core 62) that is negative, for example, about −0.5% or less, about −1% or less, or the like. In some embodiments, the core 62, the cladding 64, or both may include an updopant or a downdopant. As used herein, an "updopant" is a dopant which has a propensity to raise the refractive index relative to pure undoped silica and a "downdopant" is a dopant which has a propensity to lower the refractive index relative to pure undoped silica.

The core 62 may comprise a diameter of about 10 µm to about 500 µm, about 25 µm to about 250 µm, and all ranges and subranges therebetween. For example, the diameter of the core 62 may comprise about 15 µm, 20 µm, 30 µm, 40 µm, 50 µm, 75 µm, 100 µm, 125 µm, 150 µm, 175 µm, 200 µm, 225 µm, 250 µm, 275 µm, 300 µm, 325 µm, 350 µm, 375 µm, 400 µm, 425 µm, 450 µm, 475 µm, or the like. The cladding 64 may comprise a thickness of about 10 µm or more, about 20 µm or more, or the like. For example, the cladding 64 may comprise an outer diameter of about 10 µm to about 600 µm, about 50 µm to about 450 µm, and all ranges and subranges therebetween, for example, about 60 µm, 75 µm, 100 µm, 125 µm, 150 µm, 175 µm, 200 µm, 250 µm, 300 µm, 350 µm, 400 µm, 450 µm, 500 µm, 550 µm, or the like.

Referring still to FIGS. 2 and 3, the scattering region 65 comprises a plurality of scattering structures 66 configured to scatter photons, such as entangled photons, that attenuate from the core 62. Without intending to be limited by theory, when entangled photons attenuate from the core 62, for example, as a result of Rayleigh scattering, interaction between the entangled photon and the scattering region 65 scatters the attenuated entangled photon and disentangles the photon (now an attenuated disentangled photon) from the other photons propagating within the quantum communication system 10. Scattering the attenuated entangled photon causes the attenuated entangled photon to dephase from the other photons with which the attenuated entangled photon is entangled, thereby disentangling the attenuated entangled photon. Thus, when the now disentangled attenuated photon is subsequently absorbed, for example, by the coating layer 68, the absorption process will not alter the entanglement of the remaining entangled photons propagating in the quantum communication system 10.

As depicted in FIGS. 2 and 3, the scattering region 65 is positioned in the optical fiber link 60',60" radially spaced apart from the core 62, for example, spaced radially outward from a core-cladding interface 63. While the scattering region 65 induces a post-attenuation scattering event to disentangle the attenuated photon from the remaining photons, radially spacing the scattering region 65 apart from the core-cladding interface 63 prevents the scattering region 65 from inducing attenuation of entangled photons propagating along the optical fiber links 60',60". For example, the radial spacing distance between the scattering region 65 and the core-cladding interface 63 may comprise from about 5 µm or greater, for example, about 10 µm or greater, about 20 µm or greater, about 30 µm or greater, about 40 µm or greater, about 50 µm or greater, or the like. For example, the radial spacing distance between the scattering region 65 and the core-cladding interface 63 may comprise from about 5 µm to about 100 µm, about 10 µm to about 50 µm, about 15 µm to about 30 µm, or the like.

For example, in the embodiment depicted in FIG. 2 (i.e. the optical fiber link 60'), the scattering region 65 is disposed in the cladding 64 and in the embodiments depicted in FIG. 2, the scattering region 65 is disposed within the coating layer 68. The scattering structures 66 of the scattering region 65 disposed in the cladding 64 may comprise a refractive index differential from the cladding 64 of about 0.05 or more (e.g., the difference in refractive indices between the cladding 64 and the scattering structures 66 is about 0.05 or greater). In some embodiments, the difference in refractive indices between the cladding 64 and the scattering structures 66 is about 0.1 or more. That is, the index of refraction of the scattering structures 66 may be at least 0.1 larger than the index of refraction of the cladding 64.

Further, the scattering structures 66 of the scattering region 65 disposed in the coating layer 68 may comprise a refractive index differential from the coating layer 68 of about 0.05 or more (e.g., the difference in refractive indices between the coating layer 68 and the scattering structures 66 is about 0.05 or greater). In some embodiments, the difference in refractive indices between the coating layer 68 and the scattering structures 66 is about 0.1 or more. That is, the index of refraction of the scattering structures 66 may be at least 0.1 larger than the index of refraction of coating layer 68.

While FIGS. 2 and 3 depict two example embodiments, the scattering region 65 may be disposed at any radial location of the optical fiber links 60',60" spaced radially outward from the core-cladding interface 63. For example, in some embodiments the scattering region 65 may be disposed in the cladding 64 and the coating layer 68 and in other embodiments, the scattering region 65 may be disposed in an additional layer not depicted in FIGS. 2 and 3.

Referring still to FIGS. 2 and 3, the scattering structures 66 of the scattering region 65 may comprise gas filled voids, solid particles, or the like. Some examples of the scattering structures 66 of the scattering region 65 and some processes for forming scattering structures 66 are described with respect to light-diffusing optical fibers having randomly arranged and randomly sized gas filled-voids (also referred to as "random air lines" or "nanostructures" or "nano-sized structures") in U.S. Pat. No. 7,450,806, and in U.S. patent application Ser. Nos. 12/950,045, 13/097,208, and 13/269,055, herein incorporated by reference in their entirety.

In embodiments in which the scattering structures 66 of the scattering region 65 comprise gas filled voids, the gas filled voids may be arranged in a random or organized pattern and may run parallel to the length of the optical fiber link 60',60" or may be helical (i.e., rotating along the long axis of the optical fiber link 60',60"). The optical fiber link 60',60" may comprise a large number of gas filled voids, for example more than 50, more than 100, or more than 200 voids in the cross section of the optical fiber link 60',60". The gas filled voids may contain, for example, $SO_2$, Kr, Ar, $CO_2$, $N_2$, $O_2$, or a combination thereof thereof. Furthermore, the plurality of scattering structures 66, such as the gas filled voids, can be randomly or non-periodically disposed in the scattering region 65, however, in other embodiments the gas filled voids may be periodically disposed.

In some embodiments, the scattering structures 66 may comprise solid particles (e.g., organic or inorganic solid particles), liquid droplets, or combinations thereof. Example solid organic particles include pigments, polymers, for example, polyethylene, polypropylene, syndiotactic polystyrene, nylon, polyethylene terephthalate, polyketones, polyurethanes, styrene-butadiene-styrene block copolymers, polymethyl methacrylate in polystyrene, acrylonitrile-butadiene-styrene, and combinations thereof. Example inorganic materials that may be used in the scattering structures 66 include pigments, oxides, or mineral fillers, for example, silica, alumina, zirconia, titania, cerium oxide, tin oxide, zinc peroxide, antimony oxide, and combinations thereof. In some embodiments, the scattering structures 66 may comprise ground silicates or mineral fillers like quartz, talc, mullite, cordierite, clay, nepheline syenite, calcium carbonate, aluminum trihydrate, barium sulfate, wallastonite, mica, feldspar, pyrophyllite, diatomite, perlite, cristobalite, and combinations thereof. During manufacture, the scattering structures 66 may disposed in the optical fiber link 60',60" (for example in a glass component of the optical fiber link 60',60", such as the cladding 64 via soot pressing, solution doping, or the like. Further, in embodiments in which the scattering structures 66 are disposed in the coating layer 68, the scattering structures 66 may be formed in-situ in the coating layer, for example, via crystallization, phase separation, or the like. Moreover, it should be understood that the scattering structures 66 may comprise any combination of the scattering structure materials described herein.

The cross-sectional size (e.g., diameter) of the scattering structures 66 (e.g., gas filled voids or other scattering structures) may be from about 10 nm to about 10 µm and the length may vary from about 1 µm to about 10 m. In some embodiments, the cross sectional size of the scattering structures 66 (e.g., gas filled voids or other scattering structures) is about 10 nm, 20 nm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 1 µm, 2 µm, 3 µm, 4 µm, 5 µm, 6 µm, 7 µm, 8 µm, 9 µm, or 10 µm. In some embodiments, the length of the of the scattering structures 66 (e.g., gas filled voids or other scattering structures) is about 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1000 µm, 5 mm, 10 mm, 50 mm, 100 mm, 500 mm, 1 m, 5 m, 10 m, 20 m, or 50 m. Further, a fill fraction of the scattering region 65 may comprise from about 0.5% to about 20%, 1% and 15% and all ranges and sub-ranges therebetween, for example, about 1%, 2%, 3%, 4%, 5%, 6%, 7%, 8%, 9%, 10%, 11%, 12%, 13%, 14%, 15%, 16%, 17%, 18%, 19% or the like. As used herein, "fill fraction" refers to the percentage of the volume of the scattering region 65 filled by scattering structures 66.

Moreover, the cross-sectional size of the scattering structures 66 may differ from the wavelength of the photons propagating in the optical fiber links 60',60" by about 20% or less to effectively shift the polarization and the optical phase of an attenuated entangled photon (e.g., to disentangle the attenuated entangled photon from the other photons propagating in the optical fiber links 60',60". For example, the scattering structures 66 may differ from the wavelength of the photons propagating in the optical fiber links 60',60" by about 18% or less, 16% or less, 15% or less, 14% or less, 12% or less, 10% or less, 8% or less, 6% or less, 5% or less, 4% or less, 2% or less, 1% or less, or the like. When the cross-sectional size of the scattering structures 66 differs from the wavelength of the photons propagating in the optical fiber links 60',60" by about 20% or less, Mie scattering, instead of Rayleigh scattering, occurs. Without intending to be limited by theory, Mie scattering introduces phase shifts, polarization shifts, and structural wavelength dependent phase shifts onto the wavelength band of the attenuated entangled photon significant enough to disentangle the attenuated entangled photon from the other photons propagating in the optical fiber links 60',60".

Figure 4:
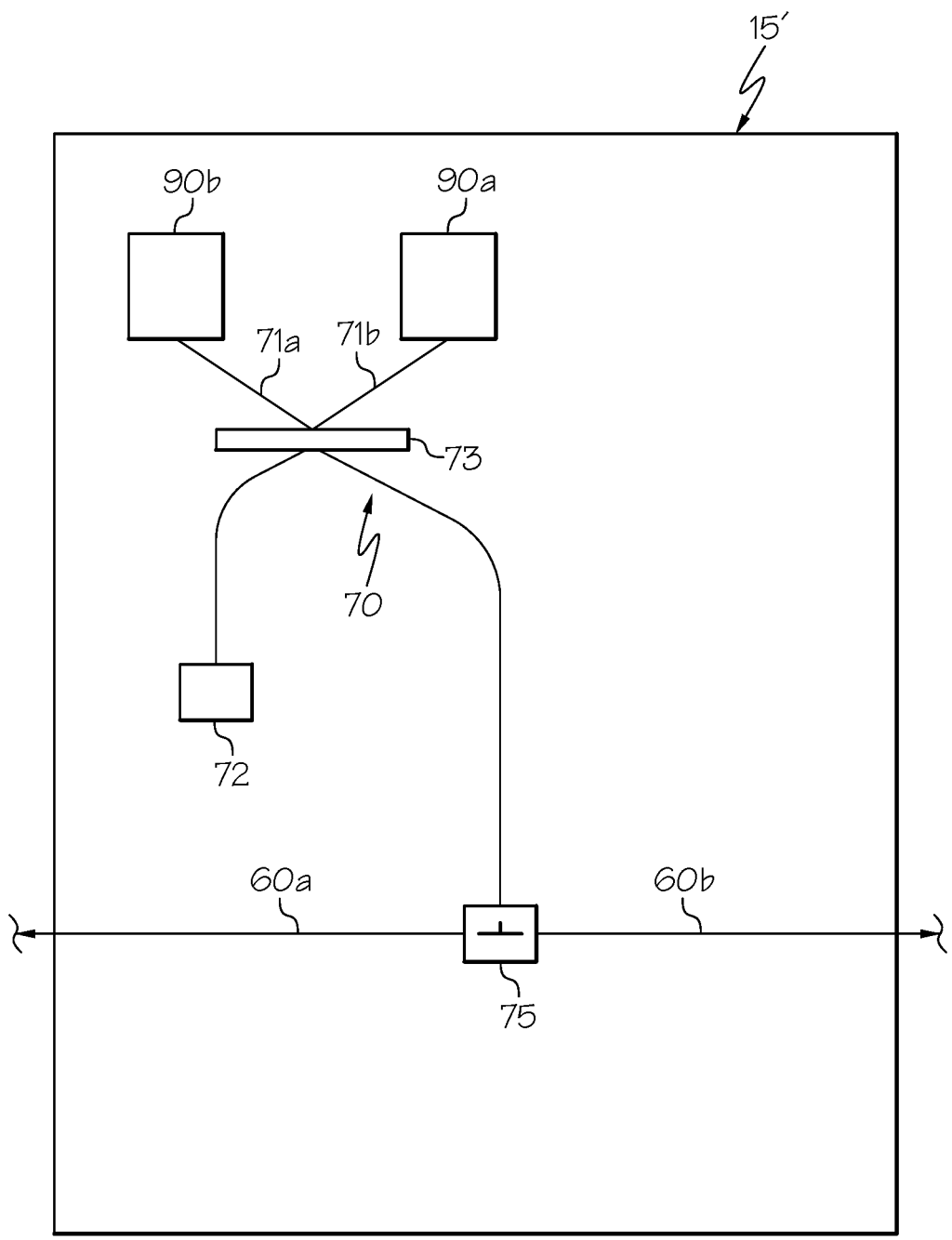
FIG. 4 schematically depicts an example multiphoton entanglement generator having two parametric down conversion generators, according to the embodiments shown and described herein.

Referring now to FIG. 4, a non-limiting embodiment of a multiphoton entanglement generator 15' is depicted. The multiphoton entanglement generator 15' is structurally configured to generate four or more entangled photons, for example, two or more entangled pairs of photons. The multiphoton entanglement generator 15' may be positioned in the quantum communication system 10, described above. Further, as depicted in FIG. 4, the first optical fiber link 60a and the second optical fiber link 60b are depicted as optically coupled to the multiphoton entanglement generator 15' and may comprise any of the optical fiber links 60',60" (FIGS. 2 and 3).

In operation, the multiphoton entanglement generator 15' may output two or more entangled photons into each optical fiber link 60. When two or more entangled photons are output into each optical fiber link 60, if one entangled photon of the two or more entangled photons is attenuated as the two or more entangled photons traverse the optical fiber link 60, the one or more remaining entangled photons of the two or more entangled photons may be received by a component optically coupled to the opposite end of the optical fiber link, for example, the first photon detector unit 12, the second photon detector unit 14, a quantum repeater (as described below with respect to FIGS. 5-7), or any other known or yet to be developed component of a system configured for quantum communications. By generating additional entangled photons with the multiphoton entanglement generator 15', the core length of each optical fiber link 60 may be lengthened without photon attenuation reducing the success rate of the quantum communication system 10. For example, each optical fiber link 60 may comprise about 5 km, 10 km, 20 km, 40 km, 80 km, or more.

As depicted in FIG. 4, the multiphoton entanglement generator 15' may comprise two parametric down conversion generators 90a, 90b (each configured to output an entangled pair of photons), entanglement optics 70, a pathway splitter 75, and an entanglement detector 72. In some embodiments, the entanglement optics 70 comprise a first entangling pathway 71a optically coupled to and extending between a first parametric down conversion generator 90a and the entanglement detector 72 and a second entangling pathway 71b optically coupled to and extending between a second parametric down conversion generator 90b and the pathway splitter 75. Additional entangling pathways 71 are contemplated in embodiments comprising additional parametric down conversion generators 90. In some embodiments, the entanglement optics 70 further comprise a beamsplitter 73 positioned such that each entangling pathway 71a, 71b traverses the beamsplitter 73. In operation, the entanglement optics 70 are structurally configured to entangle multiple photons when the multiple photons simultaneously traverse the beamsplitter 73. For example, when each entangled pair of photons output by the parametric down conversion generators 90a, 90b simultaneously traverse the beamsplitter 73, all four photons are entangled with each other.

Further, the entanglement optics 70 are configured such that some or all of the entangled photons output by each of the parametric down conversion generators 90a, 90b are received by the entanglement detector 72 and/or the pathway splitter 75. For example, when a first entangled pair of photons are output by the first parametric down conversion generator 90a and a second entangled pair of photons are output by the second parametric down conversion generator 90a and these two entangled pairs of photons are entangled with each other at the beamsplitter 73, there is a probability that one of at least three outcomes occur, which are mathematically described by the wave function:

$$|\Psi\rangle_{AA'} = -\left[\frac{1}{2}|2, 2\rangle + \sqrt{\frac{3}{8}}(|4, 0\rangle + |0, 4\rangle)\right].$$

In a first outcome, both the entanglement detector 72 and the pathway splitter 75 receive two of the four entangled photons, mathematically described by the ket|2,2⟩ in the above wave function. In a second outcome, the entanglement detector 72 receives the four entangled photons, mathematically described by one of the kets|4,0⟩ or |4,0⟩ in the above wave function. In a third outcome, the pathway splitter 75 receives the four entangled photons, mathematically described by one of the kets|4,0⟩ or |4,0⟩ in the above wave function. In some embodiments, the probability that the pathway splitter 75 receives the four entangled photons is about ⅜. Further, embodiments comprising additional parametric down conversion generators are contemplated such that additional entangled pairs of photons (e.g., N entangled photons) may be entangled by the entanglement optics 70. In an embodiment comprising N entangled photons, the probability that the N entangled photons are received by the entanglement detector 72, the pathway splitter 75, or a combination of both is mathematically described by the generalized ket:

$$|N, N\rangle_{out} = \frac{i^N}{N! \, 2^N} \sum_{p=0}^{N} \binom{N}{p} \sqrt{(2p)! \, (2N - 2p)!} \, |2p, 2N - 2p\rangle.$$

Further, in some embodiments, at least a portion of both the first and second entangling pathways 71a, 71b may comprise optical waveguides, such as optical fibers. For example, a portion of the first entangling pathway 71a that extends between the beamsplitter 73 and the pathway splitter 75 and a portion of the second entangling pathway 71b that extends between the beamsplitter 73 and the pathway splitter 75 may each comprise an optical fiber.

In some embodiments, the pathway splitter 75 is structurally configured to direct entangled pairs of photons into optical fiber links 60 (e.g., the first optical fiber link 60a and the second optical fiber link 60b) optically coupled to the pathway splitter 75. For example, when the pathway splitter 75 receives four entangled photons, the pathway splitter 75 may direct two of the four entangled photons into the first optical fiber link 60a and the pathway splitter 75 may direct two of the four entangled photons into the second optical fiber link 60b. Further, in embodiments when the multiphoton entanglement generator 15' is configured to generate more than four entangled photons, the pathway splitter 75 may direct a first subset (e.g., about half) of the entangled photons into the first optical fiber link 60a and the pathway splitter 75 may also direct a second subset (e.g., about half) of the entangled photons into the second optical fiber link 60b. In some embodiments, the pathway splitter 75 may comprise a fused biconical taper splitter, a planar lightwave circuit splitter, or the like.

In some embodiments, the entanglement detector 72 is structurally configured to measure the number of photons received by the entanglement detector 72, which also provides information regarding the number of photons received by the pathway splitter 75. For example, if two entangled photons are output by each of the first and second parametric down conversion generators 90a, 90b and zero entangled photons are received by the entanglement detector 72, than all four entangled photons are received by the pathway splitter 75. In some embodiments, the entanglement detector 72 may comprise a multi-photon detector. In alternative embodiments, the entanglement detector 72 may comprise a single-photon detector, e.g., a superconducting nanowire single-photon detector, a low noise photodiode, or the like.

In some embodiments, the parametric down conversion generators 90a, 90b of the multiphoton entanglement generator 15' may each comprise a laser source optically coupled to one or more non-linear crystals. In some embodiments, when the parametric down conversion generators 90a, 90b each comprise a single laser source optically coupled to a single non-linear crystal, each parametric down conversion generator 90a, 90b may output two entangled photons such that the multiphoton entanglement generator 15' outputs four entangled photons. For example, the laser source may be configured to output photons comprising a wavelength λ of between about 600 nm and about 1000 nm (e.g., 750 nm, 800 nm, 850 nm, or the like) into the non-linear crystal, which generates two entangled photons, each comprising a wavelength λ of between about 1200 nm and about 2000 nm (e.g., 1400 nm, 1550 nm, 1700 nm, or the like).

In another embodiment, when the parametric down conversion generators 90a, 90b comprise a single laser source optically coupled to two non-linear crystals, each parametric down conversion generator 90a, 90b may output four entangled photons such that the multiphoton entanglement generator 15' outputs eight entangled photons. For example, the laser source may be configured to output photons comprising a wavelength λ of between about 300 nm and about 500 nm (e.g., 350 nm, 400 nm, 450 nm, or the like) into a first non-linear crystal, which generates two entangled photons, each comprising a wavelength λ of between about 600 nm and about 1000 nm (e.g., 750 nm, 800 nm, 850 nm, or the like). These two entangled photons then enter a second non-linear crystal, which generates four entangled photons, each comprising a wavelength λ of between about 1200 nm and about 2000 nm (e.g., 1400 nm, 1550 nm, 1700 nm, or the like). In alternative embodiments, the multiphoton entanglement generator 15' may be structurally configured to generate an entangled pairs of photons using a four-wave mixing process or any other method or process of generating an entangled pair of photons.

Figure 5:
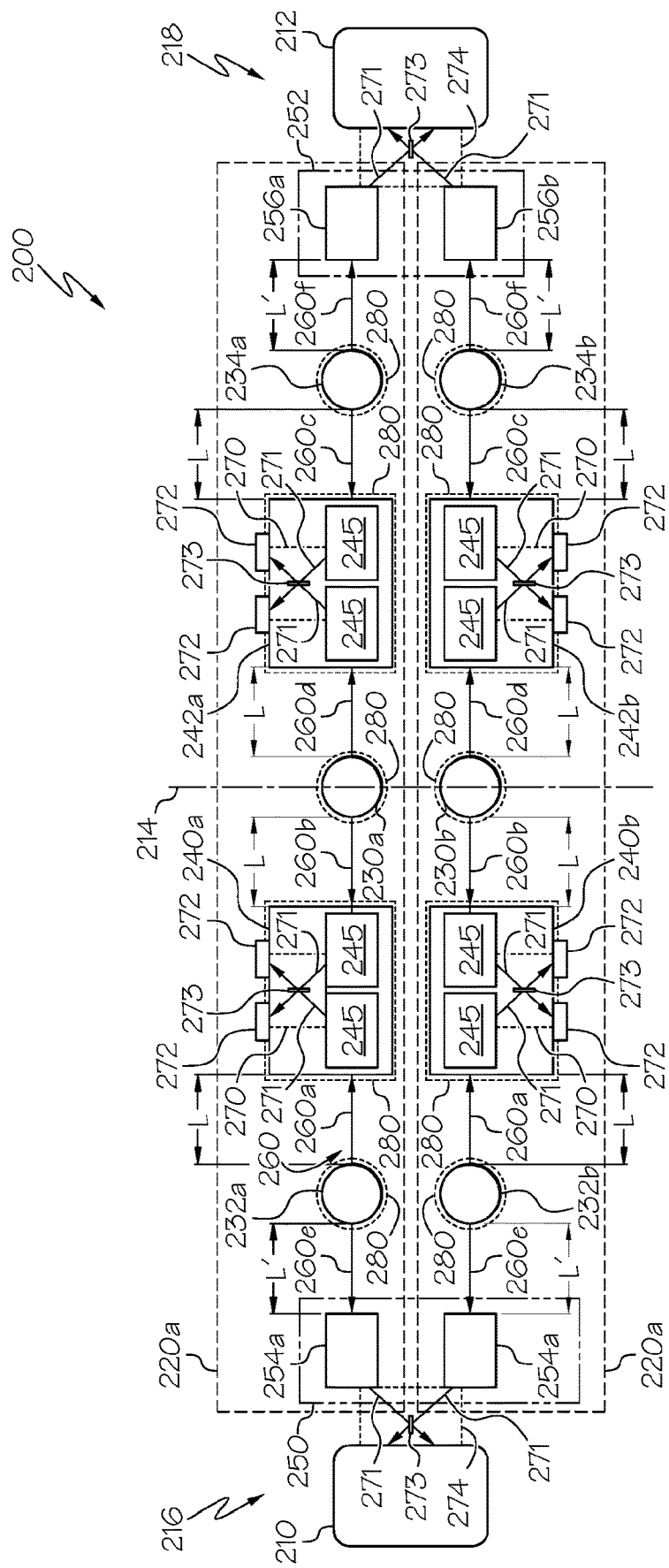
FIG. 5 schematically depicts a quantum communication system including an originating multiphoton entanglement generator, according to one or more embodiments shown and described herein.
Figure 6:
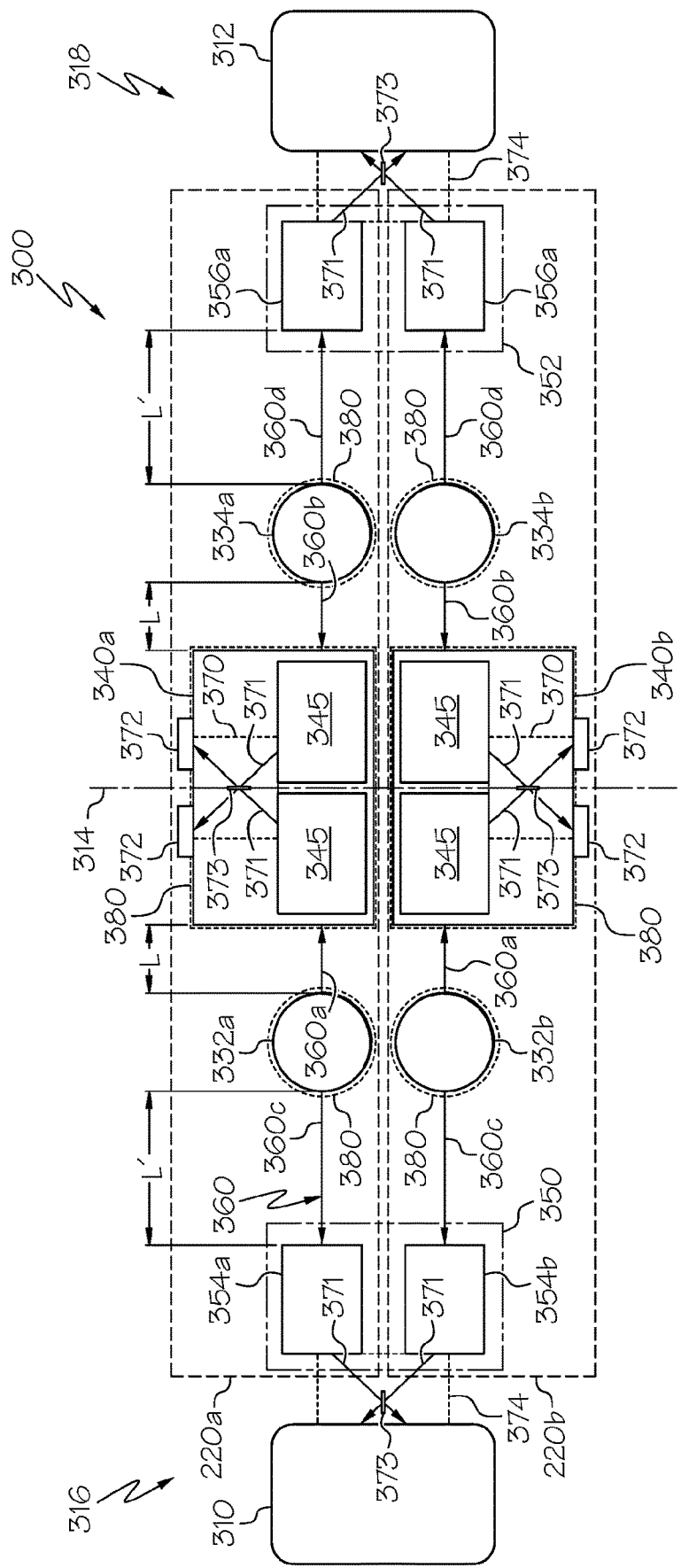
FIG. 6 schematically depicts another quantum communication system including an originating quantum repeater, according to one or more embodiments shown and described herein.

Referring now to FIGS. 5 and 6, two entanglement based, quantum communication systems 200, 300 that use the embodiments of the optical fiber links 60',60" to mitigate unwanted post-attenuation absorption events are depicted. While FIGS. 5 and 6 depict two example entanglement based systems that may utilized the methods and systems described herein, it should be understood that the methods and systems described herein may be useful in any known or yet to be developed entangled based quantum communications system.

Referring now to FIG. 5, a quantum communication system 200 comprising two photon detector units 210, 212 and two photon entanglement chains 220a, 220b is depicted. Each photon entanglement chain 220a, 220b (e.g., a first photon entanglement chain 220a and a second photon entanglement chain 220b) extends between the two photon detector units 210, 212 and comprises an originating multiphoton entanglement generator 230a, 230b, first and second intermediate multiphoton entanglement generator 232a, 232b, 234a, 234b, first and second intermediate quantum repeaters 240a, 240b, 242a, 242b, and first and second terminating quantum memories 254a, 254b, 256a, 256b. The first and second terminating quantum memories 254a, 254b, 256a, 256b are positioned at first and second ends 216, 218 of the photon entanglement chains 220a, 220b, respectively. The originating multiphoton entanglement generator 230a, 230b are positioned at respective origination locations 214 between the first and second ends 216, 218 of the photon entanglement chains 220a, 220b.

The originating multiphoton entanglement generators 230a, 230b, the first intermediate multiphoton entanglement generators 232a, 232b, and the second intermediate multiphoton entanglement generators 234a, 234b are each structurally configured to generate more than two entangled photons, for example, using a parametric down conversion process, such as described above with respect to FIGS. 1 and 4. In some embodiments, the multiphoton entanglement generators may each comprise one or more laser sources optically coupled to one or more non-linear crystals. In other embodiments, the multiphoton entanglement generators may be structurally configured to generate entangled photons using a four-wave mixing process, or any method or process of generating entangled photons. Further, each of the multiphoton entanglement generators may be structurally configured to generate entangled photons having any wavelength k, for example, between about 800 nm and about 1800 nm, for example about 1550 nm.

Referring still to FIG. 5, the first and second intermediate quantum repeaters 240a, 240b, 242a, 242b of each photon entanglement chain 220a, 220b may be optically coupled to the originating multiphoton entanglement generator 230a, 230b of the photon entanglement chains 220a, 220b by optical fiber links 260 of core length L and optically coupled to first and second intermediate multiphoton entanglement generators 232a, 232b, 234a, 234b of each photon entanglement chain 220a, 220b by optical fiber links 260 of core length L. It should be understood that optical fiber links 260 may comprise any optical fibers, for example, single core optical fibers, multicore optical fibers, or the like. For example, the optical fiber links 260 may comprise any of the embodiments of the optical fiber links 60',60", described above with respect to FIGS. 2 and 3 to mitigate post-attenuation absorption events and reduce the measurement error of the communication system 200.

In the embodiment depicted in FIG. 5, the first intermediate quantum repeater 240a, 240b may be optically coupled to the first intermediate multiphoton entanglement generator 232a, 232b by first optical fiber links 260a and may be optically coupled to the originating multiphoton entanglement generator 230a, 230b by second optical fiber links 260b. Further the second intermediate quantum repeater 242a, 242b may be optically coupled to the second intermediate multiphoton entanglement generator 234a, 234b by third optical fiber links 260c and may be optically coupled to the originating multiphoton entanglement generator 230a, 230b by fourth optical fiber links 260d. In some embodiments, the first optical fiber links 260a, the second optical fiber links 260b, the third optical fiber links 260c, and the fourth optical fiber links 260d each comprise a core length L.

In operation, the first and second intermediate quantum repeaters 240a, 240b, 242a, 242b of each photon entanglement chain 220a, 220b may each receive, for example, simultaneously receive an individual photon of the entangled pair of photons output by the originating multiphoton entanglement generators 230a, 230b and an individual photon output by one of the first or second intermediate multiphoton entanglement generators 232a, 232b, 234a, 234b. By providing optical fiber links 260 having core lengths L, the first and second intermediate quantum repeaters 240a 240a, 240b, 242a, 242b may entangle the received photons upon simultaneous arrival, without delay.

Referring still to FIG. 5, the quantum communication system 200 may further comprise one or more alignment mechanisms 280 structurally configured to optically align the components of the photon entanglement chains 220a, 220b with the optical fiber links 260. In some embodiments, the one or more alignment mechanisms 280 may comprise an alignment stage, an optical switch, or both. In some embodiments, the one or more quantum repeaters of the photon entanglement chains 220a, 220b are coupled to alignment mechanisms 280. In some embodiments, the one or more multiphoton entanglement generators of the photon entanglement chains 220a, 220b are coupled to alignment mechanisms 280.

Referring still to FIG. 5, the first and second intermediate quantum repeaters 240a, 240b, 242a, 242b of each photon entanglement chain 220a, 220b may be structurally configured such that entangled photons generated by the originating multiphoton entanglement generator 230a, 230b may be entangled with entangled photons generated by the first and second intermediate multiphoton entanglement generators 232a, 232b, 234a, 234b, respectively. For example, in some embodiments, the first and second intermediate quantum repeaters 240a, 240b, 242a, 242b of each photon entanglement chain 220a, 220b may each comprise two quantum memories 245 and entanglement optics 270.

The entanglement optics 270 may include two entangling pathways 271 optically coupled to and extending between the two quantum memories 245 and two entanglement detectors 272. Further, the entanglement detectors 272 may comprise single-photon detectors, such as superconducting nanowire single-photon detectors, low noise photodiodes, or the like. The entanglement optics 270 may further comprise a beamsplitter 273 positioned such that each entangling pathway 271 traverses the beamsplitter 273. The entanglement optics 270 may be structurally configured to entangle particles when particles output by the quantum memories 245 simultaneously traverse the beamsplitter 273, for example, a pair of Stokes photons or a pair of anti-Stokes photons output by the quantum memories 245. Further, the entanglement optics 270 may be housed within an optical waveguide and the individual intermediate quantum repeater 240a, 240b, 242a, 242b, the associated entanglement optics 270, and the associated entanglement detectors 272 may form a photonic integrated circuit. In alternative embodiments, the first and second intermediate quantum repeaters 240a, 240b, 242a, 242b may comprise entanglement optics 270 without quantum memories 245, for example, entanglement optics 270 structurally configured to entangle pair of particles, such as photons, received by the first and second intermediate quantum repeaters 240a, 240b, 242a, 242b.

In operation, the first and second intermediate quantum repeaters 240a, 240b, 242a, 242b of each photon entanglement chain 220a, 220b may receive one or more entangled photons generated by one of the originating multiphoton entanglement generators 230a, 230b, receive one or more entangled photons generated by the first and second intermediate multiphoton entanglement generators 232a, 232b, 234a, 234b of one of the photon entanglement chains 220a, 220b, respectively, and entangle the received photons. For example, the first intermediate quantum repeaters 240a, 240b may receive one or more entangled photons generated by the originating multiphoton entanglement generator 230a, 230b and may receive one or more entangled photons generated by the first intermediate multiphoton entanglement generators 232a, 232b. The second intermediate quantum repeaters 242a, 242b may receive one or more entangled photons generated by the originating multiphoton entanglement generator 230a, 230b and may receive one or more entangled photons generated by the second intermediate multiphoton entanglement generators 234a, 234b.

The first and second intermediate multiphoton entanglement generators 232a, 232b, 234a, 234b of each photon entanglement chain 220a, 220b may be optically coupled to the first and second terminating quantum memories 254a, 254b, 256a, 256b, respectively, of the photon entanglement chains 220a, 220b by optical fiber links 260 of core lengths L', where L'>L. The core length L' allows photon entanglement to occur at the first and second intermediate quantum repeaters 240a 240a, 240b, 242a, 242b while entangled photons output by the first and second intermediate multiphoton entanglement generators 232a, 232b, 234a, 234b are traveling though the optical fiber link 260 having core length L'. Accordingly, when the photons reach the first and the second terminating quantum memories 254a, 254b, 256a, 256b, the photons arriving at the first terminating quantum memories 254a, 254b of a respective photon entanglement chain 220a, 220b, may be entangled with the photons arriving at the second terminating quantum memories 256a, 256b of the same photon entanglement chain 220a, 220b.

For example, fifth optical fiber links 260e may be optically coupled to the first intermediate multiphoton entanglement generator 232a, 232b and disposed between the first intermediate multiphoton entanglement generator 232a, 232b and the first end 216 of the photon entanglement chains 210a, 210b. For example, the fifth optical fiber links 260e may optically couple the first intermediate multiphoton entanglement generators 232a, 232b and the first terminating quantum memories 254a, 254b. In other embodiments, additional components may be disposed between the first intermediate multiphoton entanglement generators 232a, 232b and the first terminating quantum memories 254a, 254b. Further, sixth optical fiber links 260f may be optically coupled to the second intermediate multiphoton entanglement generator 234a, 234b and disposed between the first intermediate multiphoton entanglement generator 234a, 234b and the second end 218 of the photon entanglement chains 210a, 210b. For example, the sixth optical fiber links 260f may optically couple the second intermediate multiphoton entanglement generators 234a, 234b and the second terminating quantum memories 256a, 256b. In other embodiments, additional components may be disposed between the second intermediate multiphoton entanglement generators 234a, 234b and the first terminating quantum memories 256a, 256b. Moreover, the fifth optical fiber links 260e and the sixth optical fiber links 260f may each comprise a core length L', where L'>L.

Referring still to FIG. 5, the first and second terminating quantum memories 254a, 254b, 256a, 256b of each of the two photon entanglement chains 220a, 220b form first and second cross-chain quantum repeaters 250, 252, respectively, structurally configured to generate measurable entangled particles. In operation, the cross-chain quantum repeaters 250, 252 entangle photons from each photon entanglement chain 220a, 220b. For example, the first and second cross-chain quantum repeaters 250, 252 may receive photons generated by the first and the second intermediate multiphoton entanglement generators 232a, 232b, 234a, 234b of each photon entanglement chain 220a, 220b, respectively, entangle the received photons such that photons generated by the first and second intermediate multiphoton entanglement generators 232a, 232b, 234a, 234b of each photon entanglement chain 220a, 220b are entangled, and generate a measurable entangled particle measurable by the photon detector units 210, 212.

Referring still to FIG. 5, the first and second cross-chain quantum repeaters 250, 252 of each photon entanglement chain 220a, 220b may further comprise terminating entanglement optics 274 including one or more entangling pathways 271 optically coupled to and extending between the terminating quantum memories 254a, 254b, 256a, 256b and the photon detector units 210, 212. The terminating entanglement optics 274 may also include a beamsplitter 273 positioned such that each entangling pathway 271 traverses the beamsplitter. In some embodiments, the terminating entanglement optics 274 may comprise the same components as the entanglement optics 270 and may be positioned at the first end 216 and the second end 218 of the photon entanglement chains 220a, 220b. The terminating entanglement optics 274 may be structurally configured to entangle particles when particles output by the terminating quantum memories 254a, 254b, 256a, 256b simultaneously traverse the beamsplitter 273. In some embodiments, the terminating entanglement optics 274 may be housed within an optical waveguide. Additionally, the first and second cross-chain quantum repeaters 250, 252, the terminating entanglement optics 274, and the photon detector units 210, 212 may form photonic integrated circuits. In alternative embodiments, the first and second cross-chain quantum repeaters 250, 252 may comprise terminating entanglement optics 274 without terminating quantum memories 254a, 254b, 256a, 256b, for example, terminating entanglement optics 274 structurally configured to entangle particles, such as photons, received by the cross-chain quantum repeaters 250, 252.

Referring still to FIG. 5, the first and the second photon detector units 210, 212 are structurally configured to receive the measurable entangled particles generated by the first and second cross-chain quantum repeaters 250, 252, respectively. In some embodiments, each photon detector unit 210, 212 comprises a pair of photon detectors positioned in optical alignment with the terminating quantum memories 254a, 254b, 256a, 256b, and/or the terminating entanglement optics 274 such that a particle generated by an individual terminating quantum memory 254a, 254b, 256a, 256b is received by an individual photon detector. Additionally, the photon detector units 210, 212 may comprise one or more low noise photodiodes and/or one or more single-photon detectors, such as, for example, one or more superconducting nanowire single-photon detectors. In some embodiments, the photon detector units 210, 212 may comprise the same detectors as the entanglement detectors 272; however, any combination of detectors disposed in the quantum communication system 200 is contemplated.

In operation, the measurable entangled particles generated by the first and the second cross-chain quantum repeaters 250, 252 are entangled by the terminating entanglement optics 274 such that each photon detector unit 210, 212 measures a correlative entangled particle property of the measurable entangled particles. The measurable entangled particles received by each photon detector unit 210, 212 share a quantum state such that measurement of a correlative entangled particle property at the first end 216 correlates with the measurement of a correlative entangled particle property at the second end 218. The correlative entanglement particle property may comprise any measurable quantum property of the measurable entangled particle, for example a linear polarization, a circular polarization, spin, translational momentum, orbital angular momentum, or the like.

In some embodiments, the quantum communication system 200 may comprise additional quantum repeaters and additional multiphoton entanglement generators positioned between the origination location 214 and the first end 216 and positioned between the origination location 214 and the second end 218. The additional quantum repeaters and the additional multiphoton entanglement generators may be alternately disposed. Each additional quantum repeater may be disposed between and optically coupled to adjacent multiphoton entanglement generators using optical fiber links 260. Each additional multiphoton entanglement generator may be disposed between and optically coupled to an additional quantum repeater and one of another additional quantum repeater or an individual terminating quantum memory 254a, 254b, 256a, 256b using optical fiber links 260.

Any number of additional quantum repeaters and additional multiphoton entanglement generators optically coupled using optical fiber links 260 are contemplated to increase the length of the photon entanglement chains 220a, 220b, while minimizing signal attenuation between the origination location 214 and the first and second ends 216, 218. Additionally, the pair of optical fiber links 260 that are optically coupled to any one individual quantum repeater may comprise substantially equivalent core lengths such that the individual quantum repeater may simultaneously or nearly simultaneously receive individual photons output by adjacent multiphoton entanglement generators. In some embodiments, the pair of optical fiber links 260 that are optically coupled to each quantum repeater positioned increasingly outward from the origination location 214 may comprise increasingly lengthened core lengths (e.g., L, L', L", L''', etc.).

In operation, when entangled photons are simultaneously output by each multiphoton entanglement generator, each quantum repeater positioned increasingly outward from the origination location 214 receives photons output by adjacent multiphoton entanglement generators after the quantum repeaters positioned closer to the origination location 214 receive and entangle photons. Accordingly, photons traveling away from the origination location 214 become entangled while traversing the optical fiber links 260. This generates a cascading chain of entanglement swapping such that photons received by the terminating quantum memories 254a, 254b at the first end 216 of an individual photon entanglement chain 220a, 220b are entangled, upon arrival, with photons received by the terminating quantum memories 256a, 256b at the second end 218 of the same photon entanglement chain 220a, 220b.

Further, the optical fiber links 260 that are optically coupled to the terminating quantum memories 254a, 254b, 256a, 256b may have the longest core length of the plurality of optical fiber links 260 and the optical fiber links 260 that are optically coupled to the first and second intermediate quantum repeaters 240a 240a, 240b, 242a, 242b may comprise the shortest core length of the plurality of optical fiber links 260.

Referring still to FIG. 5, the correlative entangled particle property measured by each photon detector unit 210, 212 may be converted into a correlative quantum key bit. Each correlative quantum key bit may comprise a binary bit, e.g., a "1" bit or a "0" bit. In some embodiments, the correlative entangled particle property measured by each photon detector unit 210, 212 may comprise a coordinate entangled particle property such that each correlative quantum key bit produced at each photon detector unit comprises a matching binary bit. For example, when the photon detector unit 210 measures a coordinate entanglement property that comprises a "0" bit, the photon detector unit 212 may also measures a coordinate entanglement property that comprises a "0" bit. In other embodiments, the correlative entangled particle property measured by each photon detector unit comprises an orthogonal entangled particle property such that each correlative quantum key bit produced at each photon detector unit comprises an opposite binary bit. For example, when the photon detector unit 210 measures an orthogonal entanglement property that comprises a "0" bit, the photon detector unit 212 also measures an orthogonal entanglement property that comprises a "1" bit.

In some embodiments, the correlative entangled particle property may comprise any quantum information, for example, with or without converting the correlative entangled particle property into a correlative quantum key bit. For example, the photon entanglement chains 220a, 220b are structurally configured to communicate any quantum information between separate locations, for example, between the origination location 214 and one or both of the first end 216 and the second end 218 and between the first and second ends 216, 218. Further, each of the photon entanglement chains 220a, 220b (FIG. 5), 320a, 320b (FIG. 6) are structurally configured to communicate any quantum information between separate locations by generating particles comprising entangled quantum states and transmitting the entangled quantum states to and between separate locations. In some embodiments, each pair of photon entanglement chains 220a, 220b (FIG. 5), 320a, 320b (FIG. 6) described herein may be structurally configured as a one-time key pad that operates to communicate quantum information. In a non-limiting example, the quantum communication may comprise any measurable quantum property of the measurable entangled particle, for example a linear polarization, a circular polarization, spin, translational momentum, orbital angular momentum, or the like.

For example, in some embodiments, in operation, a plurality of iteratively converted correlative quantum key bits may form a quantum key at each photon detector unit 210, 212. For example, each photon detector unit 210, 212 may convert iteratively received correlative quantum key bits into a set of correlative binary bits, such that each photon detector unit 210 and 212 may receive a quantum key correlated with the quantum key received by the other photon detector unit 210, 212. This allows the quantum key to be used as a cryptography key such that communication between the first end 216 and the second end 218 over classical communication channels may be encrypted with the quantum key. Additionally, some embodiments may comprise electronic storage devices communicatively coupled to the photon detector units 210, 212 and structurally configured to electronically store the correlative quantum key bits. In other embodiments, the photon detector units 210, 212 may be structurally configured to electronically store the quantum key.

Referring now to FIG. 6, another quantum communication system 300 is depicted comprising two photon detector units 310, 312 and two photon entanglement chains 320a, 320b. Each photon entanglement chain 320a, 320b (e.g., a first photon entanglement chain 320a and a second photon entanglement chain 320b) extends between the two photon detector units 310, 312. In this embodiment, each photon entanglement chain 320a, 320b comprises an originating quantum repeater 340a, 340b, first and second intermediate multiphoton entanglement generators 332a, 332b, 334a, 334b, and first and second terminating quantum memories 354a, 354b, 356a, 356b. The first and second terminating quantum memories 354a, 354b, 356a, 356b are positioned at first and second ends 316, 318 of the photon entanglement chains, respectively.

The originating quantum repeaters 340a, 340b are positioned at respective origination locations 314 between the first and second ends 316, 318 of the photon entanglement chains 320a, 320b. The originating quantum repeaters 340a, 340b may comprise two quantum memories 345 optically coupled to the first and second intermediate multiphoton entanglement generators 332a, 332b, 334a, 334b of each photon entanglement chain 320a, 320b by optical fiber links 360 of core length L. Further, the optical fiber links 360 may comprise any optical fiber links, for example, single core optical fiber links and/or multicore optical fiber links 360. For example, the optical fiber links 360 may comprise any of the embodiments of the optical fiber links 60',60", described above with respect to FIGS. 2 and 3 to mitigate post-attenuation absorption events and reduce the measurement error of the communication system 200.

The first and second intermediate multiphoton entanglement generators 332a, 332b, 334a, 334b of each photon entanglement chain 320a, 320b are optically coupled to the first and the second terminating quantum memories 354a, 354b, 356a, 356b, respectively, of the photon entanglement chains 320a, 320b by optical fiber links 360 of core length L', where L'>L. The first and second intermediate multiphoton entanglement generators 332a, 332b, 334a, 334b are each structurally configured to generate more than two entangled photons and may comprise any of the multiphoton entanglement generators described above with respect to the quantum communication system 200.

For example, in the embodiment depicted in FIG. 6 the originating quantum repeater 340a, 340b may be optically coupled to the first intermediate multiphoton entanglement generators 332a, 332b by first optical fiber links 360a and may be optically coupled to the second intermediate multiphoton entanglement generators 334a, 334b by second optical fiber links 360b. The first optical fiber links 360a and the second optical fiber links 360b may each comprise a core length L. Further, third optical fiber links 360c may be optically coupled to the first intermediate multiphoton entanglement generators 332a, 332b and disposed between the first intermediate multiphoton entanglement generators 332a, 332b and the first end 316 of the photon entanglement chains 320a, 320b. For example, third optical fiber links 360c may optically couple the first intermediate multiphoton entanglement generators 332a, 332b and the first terminating quantum memories 354a, 354b. In other embodiments, additional components may be disposed between the first intermediate multiphoton entanglement generators 332a, 332b and the first terminating quantum memories 354a, 354b. Further, fourth optical fiber links 360d may be optically coupled to the second intermediate multiphoton entanglement generators 334a, 334b and disposed between the second intermediate multiphoton entanglement generators 334a, 334b and the second end 318 of the photon entanglement chains 320a, 320b. For example, the fourth optical fiber links 360d may optically couple the second intermediate multiphoton entanglement generators 334a, 334b and the second terminating quantum memories 356a, 356b. In other embodiments, additional components may be disposed between the second intermediate multiphoton entanglement generators 334a, 334b and the second terminating quantum memories 356a, 356b. Moreover, the third optical fiber links 360c and the fourth optical fiber links 360d may each comprise a core length L', where L'>L.

Referring still to FIG. 6, the quantum communication system 300 may further comprise one or more alignment mechanisms 380 structurally configured to optically align the components of the photon entanglement chains 320a, 320b with the optical fiber links 360. In some embodiments, the one or more alignment mechanisms 380 may comprise an alignment stage, an optical switch, or both. In some embodiments, the originating quantum repeater 340a, 340b of the photon entanglement chains 320a, 320b are coupled to alignment mechanisms 380. In some embodiments, the one or more multiphoton entanglement generators of the photon entanglement chains 320a, 320b are coupled to alignment mechanisms 380.

The originating quantum repeaters 340a, 340b of each photon entanglement chain 320a, 320b may be structurally configured such that entangled photons generated by the first intermediate multiphoton entanglement generators 332a, 332b are entangled with entangled photons generated by the second intermediate multiphoton entanglement generators 334a, 334b, respectively. For example, the originating quantum repeater 340a, 340b of each photon entanglement chain 320a, 320b may comprise two quantum memories 345 and entanglement optics 370 including two entangling pathways 371. The entangling pathways 371 are each optically coupled to and extend between one of the two quantum memories 345 and one of two entanglement detectors 372. The entanglement optics 370 may also include a beamsplitter 373 positioned such that each entangling pathway 371 traverses the beamsplitter 373. Further, the entanglement optics 370 are structurally configured to entangle particles output by the quantum memories 345 when the particles simultaneously traverse the beamsplitter, as described above with respect to quantum communication system 200. In alternative embodiments, the originating quantum repeaters 340a, 340b may comprise entanglement optics 370 without quantum memories 345, for example, entanglement optics 370 structurally configured to entangle particles, such as photons, received by the originating quantum repeaters 340a, 340b.

The first and second terminating quantum memories 354a, 354b, 356a, 356b of each of the two photon entanglement chains 320a, 320b may form first and second cross-chain quantum repeaters 350, 352, respectively, structurally configured to generate measurable entangled particles. The first and second cross-chain quantum repeaters 350, 352 may comprise terminating entanglement optics 374 and may be the first and second cross-chain quantum repeaters 250, 252, as described above with respect to quantum communication system 200.

Referring still to FIG. 6, first and the second photon detector units 310, 312 may be structurally configured to receive the measurable entangled particles generated by the first and second cross-chain quantum repeaters 350, 352, respectively. The photon detector units 310, 312 may comprise any of the photon detectors described above with respect to quantum communication systems 10 and 200. Further each photon detector unit 310, 312 may comprise a pair of photon detectors positioned in optical alignment with the terminating quantum memories 354a, 354b, 356a, 356b such that a particle generated by an individual terminating quantum memory 354a, 354b, 356a, 356b is received by an individual photon detector 310, 312.

In operation, the measurable entangled particles generated by the first and the second cross-chain quantum repeaters 350, 352 are entangled by the terminating entanglement optics 374 such that each photon detector unit 310, 312 may be a correlative entangled particle property of the measurable entangled particles, converts the correlative entangled particle property into a correlative quantum key bit, and generates a quantum key as described above with respect to quantum communication system 200. Further, in some embodiments, the quantum communication system 300 may comprise additional quantum repeaters and additional multiphoton entanglement generators positioned between the origination location 314 and the first end 316 and positioned between the origination location 314 and the second end 318, as described above with respect to quantum communication system 200.

In view of the foregoing description, it should be understood that methods and systems are contemplated for quantum information communication using a multiphoton entanglement generator configured to generate entangled photons share a quantum state to communicate a quantum key or other shared message to different photon detector units. Furthermore, the embodiments described herein include optical fiber links having a scattering region to cause post attenuation scattering events to reduce measurement errors caused by the absorption of attenuated photons, to increase the quantum bit rate and the overall effectiveness of the quantum communication system.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A quantum communication system comprising a multiphoton entanglement generator, a plurality of photon detector units, and a plurality of optical fiber links, wherein
   the plurality of photon detector units comprise a first photon detector unit and a second photon detector unit;
   the multiphoton entanglement generator is structurally configured to output more than two entangled photons;
   the plurality of optical fiber links comprise a first optical fiber link optically coupled to the multiphoton entanglement generator and disposed between the multiphoton entanglement generator and the first photon detector unit;
   the plurality of optical fiber links comprise a second optical fiber link optically coupled to the multiphoton entanglement generator and disposed between the multiphoton entanglement generator and the second photon detector unit; and
   at least one of the plurality of optical fiber links comprises a core, a cladding, and a scattering region comprising a plurality of scattering structures, wherein the scattering region is disposed radially exterior to the cladding, and wherein the scattering region is disposed radially interior to a coating layer operable to absorb a disentangled attenuated photon.

2. The quantum communication system of claim 1, wherein the scattering region is spaced radially apart from a core-cladding interface.

3. The quantum communication system of claim 2, wherein a radial spacing distance between the scattering region and the core-cladding interface is about 10 µm or greater.

4. The quantum communication system of claim 2, wherein the scattering region is disposed in the cladding.

5. The quantum communication system according to claim 1, wherein the plurality of scattering structures comprise silica, alumina, zirconia, titania, cerium oxide, tin oxide, zinc peroxide, antimony oxide, or a combination thereof.

6. The quantum communication system of claim 1, wherein the plurality of scattering structures comprise gas filled voids.

7. The quantum communication system of claim 6, wherein the gas filled voids comprise $SO_2$, Kr, Ar, $CO_2$, $N_2$, $O_2$, or a combination thereof.

8. The quantum communication system according to claim 1, wherein a cross-sectional size of each of the plurality of scattering structures is from about 20 nm to about 5000 nm.

9. The quantum communication system according to claim 1, wherein a fill fraction of the scattering region is from about 0.5% to about 20%.

10. The quantum communication system according to claim 1, wherein the multiphoton entanglement generator is structurally configured to simultaneously output more than two entangled photons.

11. The quantum communication system according to claim 1, wherein the multiphoton entanglement generator is structurally configured to output two or more pairs of entangled photons.

12. The quantum communication system of claim 11, wherein the multiphoton entanglement generator is optically coupled to the first optical fiber link and the second optical fiber link such that the multiphoton entanglement generator outputs a first pair of entangled photons into the first optical fiber link and a second pair of entangled photons into the second optical fiber link.

13. The quantum communication system according to claim 1, wherein the multiphoton entanglement generator comprises two or more parametric down conversion generators.

14. The quantum communication system of claim 13, wherein:
   the multiphoton entanglement generator further comprises entanglement optics, a pathway splitter, and an entanglement detector; and
   the entanglement optics comprise a first entangling pathway optically coupled to and extending between a first parametric down conversion generator and the entanglement detector and a second entangling pathway optically coupled to and extending between a second parametric down conversion generator and the pathway splitter.

15. The quantum communication system of claim 14, wherein the entanglement optics further comprise a beamsplitter positioned such that each entangling pathway traverses the beamsplitter; and
   the entanglement optics are structurally configured to entangle each entangled pair of photons when each entangled pair of photons output by the parametric down conversion generators simultaneously traverse the beamsplitter.

16. The quantum communication system of claim 14, wherein the pathway splitter is structurally configured to direct two or more entangled photons into the first optical fiber link and direct two or more entangled photons into the second optical fiber link.

17. The quantum communication system of claim 13, wherein each parametric down conversion generator comprises a laser source and a non-linear crystal.

18. The quantum communication system according to claim 1, wherein at least one of the plurality of photon detector units comprise one or more single-photon detectors.

19. The quantum communication system of claim 18, wherein the single-photon detector comprises a superconducting nanowire single-photon detector, a carbon nanowire detector, or a low noise photodiode.

20. A quantum communication system comprising:
   a first photon detector unit and a second detector unit; and
   two photon entanglement chains each extending between the first photon detector unit and the second photon detector unit and each comprising:
      a first end and a second end;
      a first terminating quantum memory positioned at the first end and a second terminating quantum memory positioned at the second end;
      an originating multiphoton entanglement generator, a first intermediate multiphoton entanglement generator and a second intermediate multiphoton entanglement generator;

a first intermediate quantum repeater disposed between the first intermediate multiphoton entanglement generator and the originating multiphoton entanglement generator;

a second intermediate quantum repeater disposed between the second intermediate multiphoton entanglement generator and the originating multiphoton entanglement generator;

a first optical fiber link disposed between and optically coupled to the first intermediate quantum repeater and the first intermediate multiphoton entanglement generator;

a second optical fiber link disposed between and optically coupled to the first intermediate quantum repeater and the originating multi photon entanglement generator;

a third optical fiber link disposed between and optically coupled the second intermediate quantum repeater and the second intermediate multiphoton entanglement generator a fourth optical fiber link disposed between and optically coupled to the second intermediate quantum repeater and the originating multiphoton entanglement generator;

a fifth optical fiber link is optically coupled to the first intermediate multiphoton entanglement generator and is disposed between the first intermediate multiphoton entanglement generator and the first end of the photon entanglement chain; and a sixth optical fiber link is optically coupled to the second intermediate multiphoton entanglement generator and is disposed between the second intermediate multiphoton entanglement generator and the second end of the photon entanglement chain; wherein at least one of the first optical fiber link, the second optical fiber link, the third optical fiber link, the fourth optical fiber link, the fifth optical fiber link, and the sixth optical fiber link comprises a core, a cladding, and a scattering region comprising a plurality of scattering structures and spaced radially exterior and apart from the core-cladding interface, and wherein the scattering region is disposed in a coating layer surrounding the cladding and the core, the coating layer operable to absorb a disentangled attenuated photon.

21. The quantum communication system of claim 20, wherein:
the first optical fiber link, the second optical fiber link, the third optical fiber link, and
the fourth optical fiber link each comprise a core length L;
the fifth optical fiber link and the sixth optical fiber link each comprise a core length
L'; and
L'>L.

22. The quantum communication system of claim 20, wherein:
the originating multiphoton entanglement generator, the first intermediate multiphoton entanglement generator, and the second intermediate multiphoton entanglement generator are each structurally configured to generate more than two entangled photons; and
the first and second intermediate quantum repeaters of each photon entanglement chain are structurally configured to (i) receive an individual entangled photon generated by one of the originating multiphoton entanglement generators, (ii) receive an individual entangled photon generated by the first and second intermediate multiphoton entanglement generators of one of the photon entanglement chains, respectively, and (iii) entangle the received photons.

23. The quantum communication system of claim 20, wherein:
the first and second intermediate quantum repeaters of each photon entanglement chain comprise two or more quantum memories and entanglement optics; and
the entanglement optics comprise two or more entangling pathways optically coupled to and extending between the two or more quantum memories and two entanglement detectors.

24. The quantum communication system of claim 20, wherein:
the entanglement optics further comprise a beamsplitter positioned such that each
entangling pathway traverses the beamsplitter; and
the entanglement optics are structurally configured to entangle pairs of particles when
particles output by the quantum memories simultaneously traverse the beamsplitter.

25. A quantum communication system comprising:
a first photon detector unit and a second detector unit; and
two photon entanglement chains each extending between the first photon detector unit
and the second photon detector unit and each comprising:
a first end and a second end;
a first terminating quantum memory positioned at the first end and a second
terminating quantum memory positioned at the second end;
an originating quantum repeater, a first intermediate multiphoton entanglement generator disposed between the originating quantum repeater and the first terminating quantum memory, and a second intermediate multiphoton entanglement generator disposed between the originating quantum repeater and the second terminating quantum memory;
a first optical fiber link disposed between and optically coupled to the originating quantum repeater and the first intermediate multiphoton entanglement generator;
a second optical fiber link disposed between and optically coupled to the originating quantum repeater and the second intermediate multiphoton entanglement generator;
a third optical fiber link optically coupled to the first intermediate multiphoton entanglement generator and disposed between the first intermediate multiphoton entanglement generator and the first end of the photon entanglement chain;
a fourth optical fiber link optically coupled to the second intermediate multiphoton entanglement generator and disposed between the second intermediate multiphoton entanglement generator and the second end of the photon entanglement chain; and
at least one of the first optical fiber link, the second optical fiber link, the third optical fiber link, and the fourth optical fiber link comprises a core, a cladding, and a scattering region comprising a plurality of scattering structures and disposed radially exterior from the core-cladding interface in a coating layer surrounding the cladding and the core, the coating layer operable to absorb a disentangled attenuated photon.

26. The quantum communication system of claim 25, wherein: the first optical fiber link, the second optical fiber link each comprise a core length L;
the third optical fiber link and the fourth optical fiber link each comprise a core length L'; and
L'>L.

27. The quantum communication system of claim 25, wherein:
the first intermediate multiphoton entanglement generators and the second intermediate multiphoton entanglement generators are each structurally configured to generate an entangled pair of photons; and
the originating quantum repeater of each photon entanglement chain are structurally configured to (i) receive an individual entangled photon generated by the first intermediate multiphoton entanglement generator, (ii) receive an individual entangled photon generated by the second intermediate multiphoton entanglement generator, and (iii) entangle the received photons.

28. The quantum communication system of claim 25, wherein:
the multiphoton entanglement generator comprises a quantum repeater comprising
two quantum memories and entanglement optics; and
the entanglement optics comprise two or more entangling pathways optically coupled
to and extending between the two quantum memories and two entanglement detectors.

29. The quantum communication system of claim 25, wherein:
the entanglement optics further comprise a beamsplitter positioned such that each
entangling pathway traverses the beamsplitter; and
the entanglement optics are structurally configured to entangle pairs of particles when
particles output by the quantum memories simultaneously traverse the beamsplitter.

* * * * *